(12) United States Patent
Anker et al.

(10) Patent No.: US 7,843,931 B1
(45) Date of Patent: Nov. 30, 2010

(54) ISCSI SWITCHING METHOD AND APPARATUS

(75) Inventors: Tal Anker, Modiin (IL); Alon Harel, Ramat-Gan (IL); Shlomo Pangratz, Tel-Aviv (IL)

(73) Assignee: Marvell International Ltd., Hamilton (BM)

(*) Notice: Subject to any disclaimer, the term of this patent is extended or adjusted under 35 U.S.C. 154(b) by 173 days.

(21) Appl. No.: 12/140,203

(22) Filed: Jun. 16, 2008

Related U.S. Application Data

(60) Provisional application No. 60/944,267, filed on Jun. 15, 2007.

(51) Int. Cl.
*H04L 12/56* (2006.01)
(52) U.S. Cl. .................. 370/392; 370/389; 370/395.5; 370/400
(58) Field of Classification Search .............. 370/389, 370/392
See application file for complete search history.

(56) References Cited

U.S. PATENT DOCUMENTS

| 7,499,458 | B2* | 3/2009 | McDysan et al. ........... 370/396 |
| 2003/0105830 | A1* | 6/2003 | Pham et al. ................. 709/216 |
| 2008/0137659 | A1* | 6/2008 | Levy-Abegnoli et al. .... 370/392 |

OTHER PUBLICATIONS

Bates et al., "Multiprotocol Extensions for BGP-4", IETF RFC 2858, Jun. 2000.*

* cited by examiner

*Primary Examiner*—Huy D Vu
*Assistant Examiner*—Maria Sekul

(57) ABSTRACT

A method for identifying and prioritizing iSCSI traffic in an IP network. At least one iSCSI-aware switch which receives information identifying an iSCSI session, e.g., its iSCSI target port or IP address, may multicast such identifying information to let a second iSCSI-aware switch in the IP network know the information about the iSCSI session. The second iSCSI-aware switch may update its memory, software and hardware, so as to track the iSCSI session when the iSCSI session passes through it and give it priority over other network traffic.

21 Claims, 5 Drawing Sheets

ISCSI SWITCHING METHOD AND APPARATUS

CROSS REFERENCE TO RELATED APPLICATION

This application claims the benefit of priority to previously filed U.S. provisional patent application Ser. No. 60/944,267, filed Jun. 15, 2007, entitled ISCSI-AWARE NETWORKS. That provisional application is hereby incorporated by reference in its entirety.

BACKGROUND

1. Field of the Invention

The present invention relates generally to the Internet Small Computer Systems Interface (iSCSI), and more particularly to a method of improving iSCSI data transfers.

2. Description of Related Art

The iSCSI protocol carries SCSI (Small Computer Systems Interface) commands over a commonly used IP network by encapsulating SCSI commands into TCP/IP (Transmission Control Protocol/Internet Protocol) Internet protocol packets and supporting block-based data transmission using the IP network. The ubiquity of IP networks, including the Internet, local area networks (LANs) and wide area networks (WANs), helps the adoption of the iSCSI protocol, since iSCSI can run on existing networks and no significant investment in infrastructure is required. On the other hand, sharing the network infrastructure with general network traffic may result in latency: the time required for commands and data to travel between an iSCSI initiator (i.e., an iSCSI client), and an Internet Storage Name Service (iSNS) server and an iSCSI target (i.e., an iSCSI server, which is a storage device). When data transfers involve several request and response transactions, the latency may cause low iSCSI performance which may impede further iSCSI developments.

One approach to reduce the latency is to use an iSCSI-aware switch which gives priority to iSCSI traffic that is flowing between iSCSI initiators and iSCSI targets. An iSCSI-aware switch needs to listen to the traffic destined to an iSCSI target port in order to identify iSCSI sessions. When an iSCSI session is identified, its related traffic may be given priority over other network traffic flowing through the switch. The iSCSI target port is a piece of information an iSCSI initiator may receive from an iSNS server, and is an application logical port, e.g., a TCP or UDP (User Datagram Protocol) logical port.

However, switches on the communication path between an iSCSI initiator and an iSCSI target may not be on the communication path between the iSCSI initiator and an iSNS server, and consequently may miss information about the iSCSI target port and fail to identify an iSCSI session.

Therefore, it may be desirable to provide a method to distinguish and prioritize iSCSI traffic in an IP network.

BRIEF DESCRIPTION OF THE DRAWING FIGURES

Embodiments of the present invention are described herein with reference to the accompanying drawings, similar reference numbers being used to indicate functionally similar elements.

DETAILED DESCRIPTION

In accordance with an embodiment of the present invention, a method for identifying and prioritizing iSCSI traffic in an IP network is provided. At least one iSCSI-aware switch which receives information identifying an iSCSI session, e.g., its iSCSI target port or IP address, may multicast such identifying information to let at least a second iSCSI-aware switch in the IP network know information about the iSCSI session. The second iSCSI-aware switch, which may receive multiple data or control signal flows, may update its memory, software and hardware, so as to track the iSCSI session when the iSCSI session passes through it and give it priority over other network traffic. The path of the iSCSI control packets may be different from that of the iSCSI data.

Figure 1:
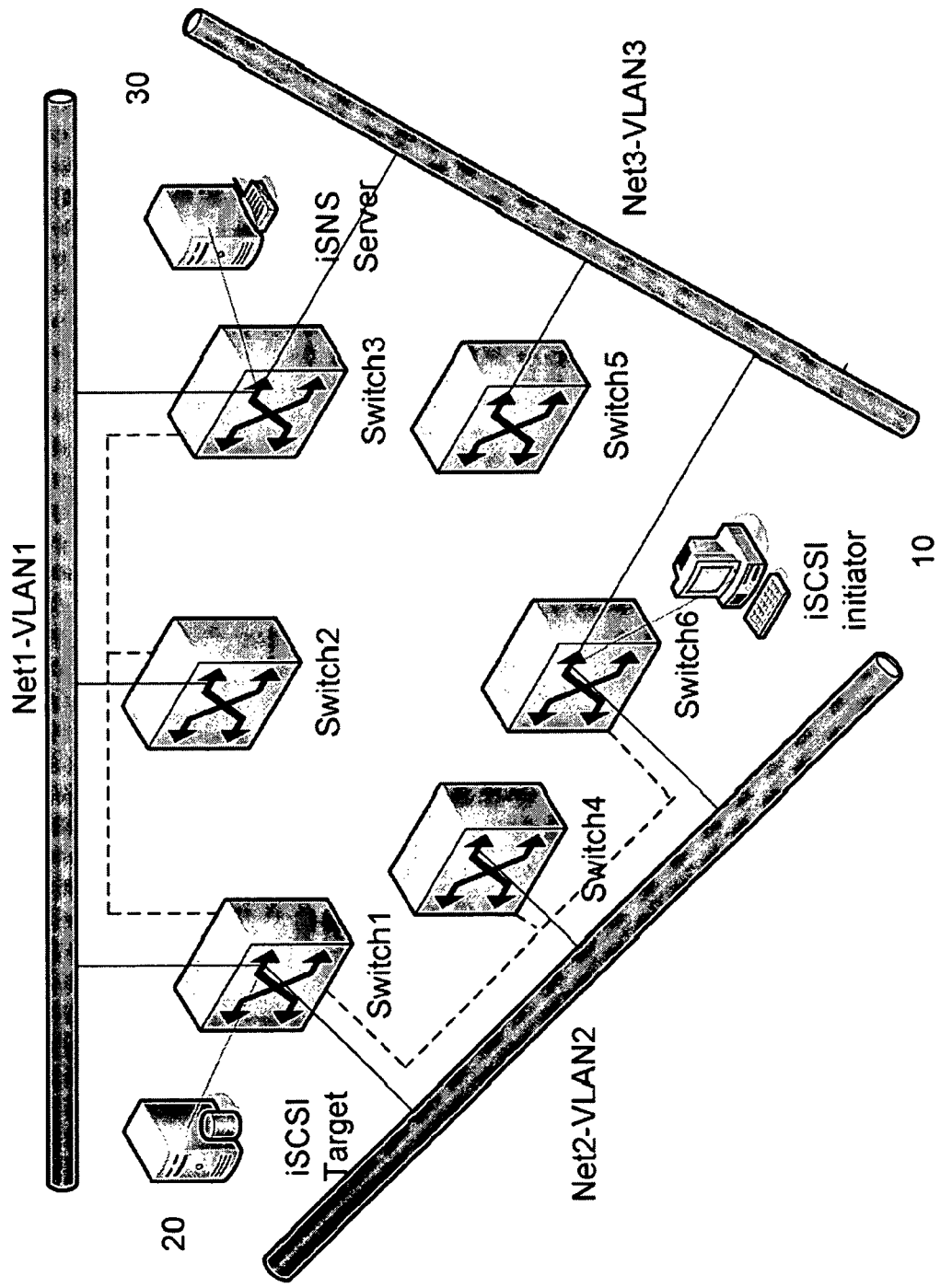
FIG. 1 illustrates an iSCSI-aware network according to one embodiment of the present invention.

FIG. 1 illustrates an iSCSI-aware network according to one embodiment of the present invention. As shown, an iSCSI initiator 10 may want to write data to an iSCSI target 20, and send a request to an iSNS server 30 through switches 6, 5, 3 and a VLAN3 to obtain information about the iSCSI target 20, e.g., its presence and location. The iSNS server 30 may send a response back to the iSCSI initiator 10 via switches 3, 5, 6 and the VLAN3, and the response may include the port of the iSCSI target 20. Meanwhile, the iSNS server 30 may send a message to the iSCSI target 20 via switches 3, 2 and 1 and a VLAN1, informing the iSCSI target 20 the port of the iSCSI initiator 10 and the write command. The iSCSI target 20 may send a protocol data packet (PDU) encapsulating a ready-to-transmit message to the iSCSI initiator 10 via switches 1, 4 and 6 and a VLAN2. After receiving the ready-to-transmit message, the iSCSI initiator 10 may begin to transmit a data PDU to the iSCSI target 20 via switches 6, 4 and 1 and the VLAN2.

Each switch in the iSCSI system shown in FIG. 1 may detect information about an iSCSI session and multicast it, so that switches which will be involved in the iSCSI session but will not otherwise get the information about the iSCSI session may receive information about the iSCSI session in advance and be prepared for the iSCSI session. For example, the switch 3 may listen to the response from the iSNS server 30 to the iSCSI initiator 10, obtain information identifying the ISCSI session between the iSCSI initiator 10 and target 20, e.g., the port or IP address of the iSCSI target 20, and multicast it.

Other switches may receive the information identifying the iSCSI session, update its hardware and software, track the iSCSI session and give it priority over other network traffic. For example, the switch 4 is not on the communication path between the iSNS server 30 and the iSCSI initiator 10, and may not get information about the iSCSI session between the iSCSI initiator 10 and target 20 from the iSNS server 30. However, it may receive the multicast from the switch 3. Consequently, the switch 4 may track the iSCSI session between the iSCSI initiator 10 and target 20, and give it priority with it arrives.

Figure 2A:
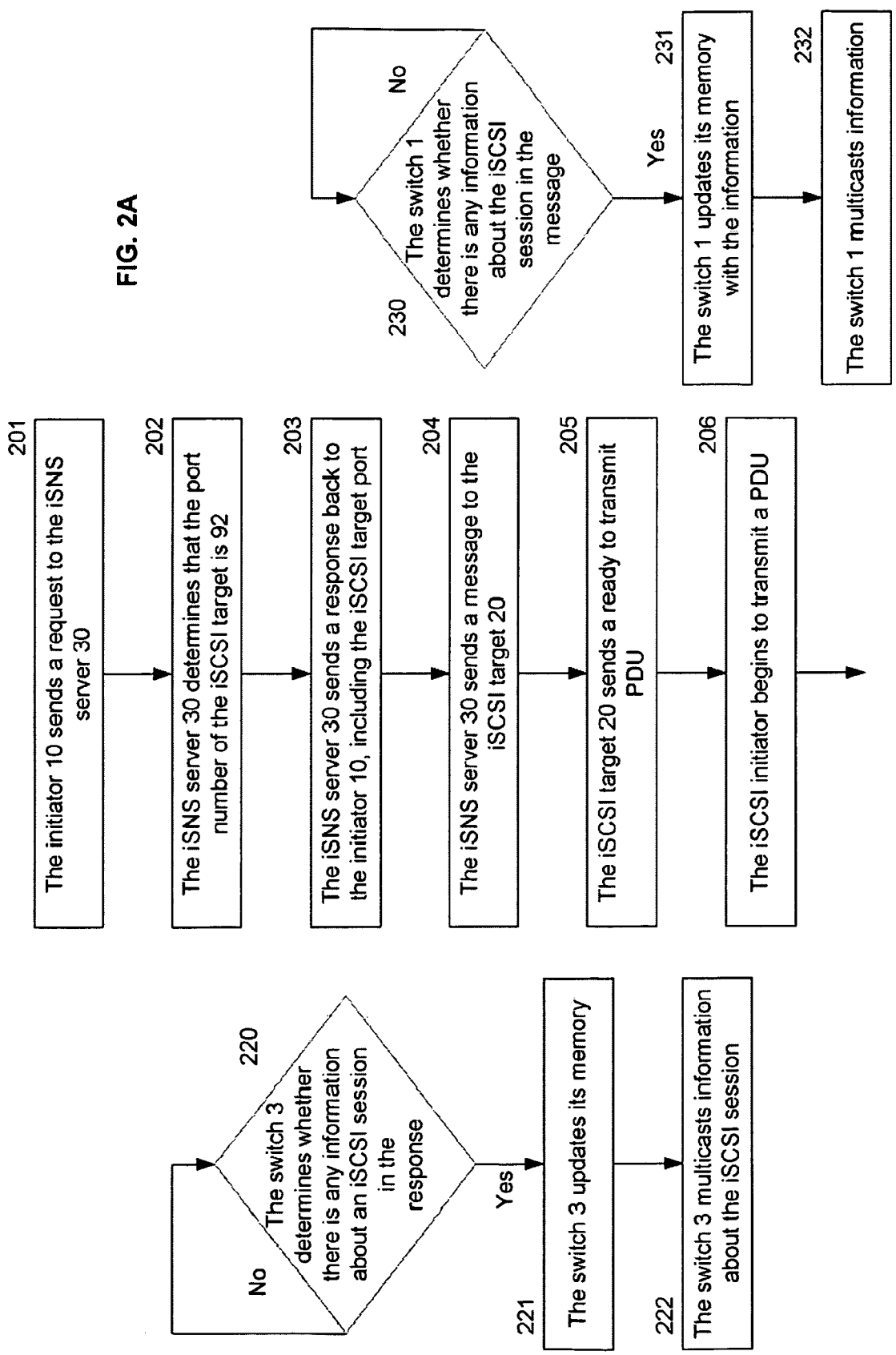
FIGS. 2A and 2B illustrate a flow chart of a method for prioritizing iSCSI traffic according to one embodiment of the present invention.
Figure 2B:
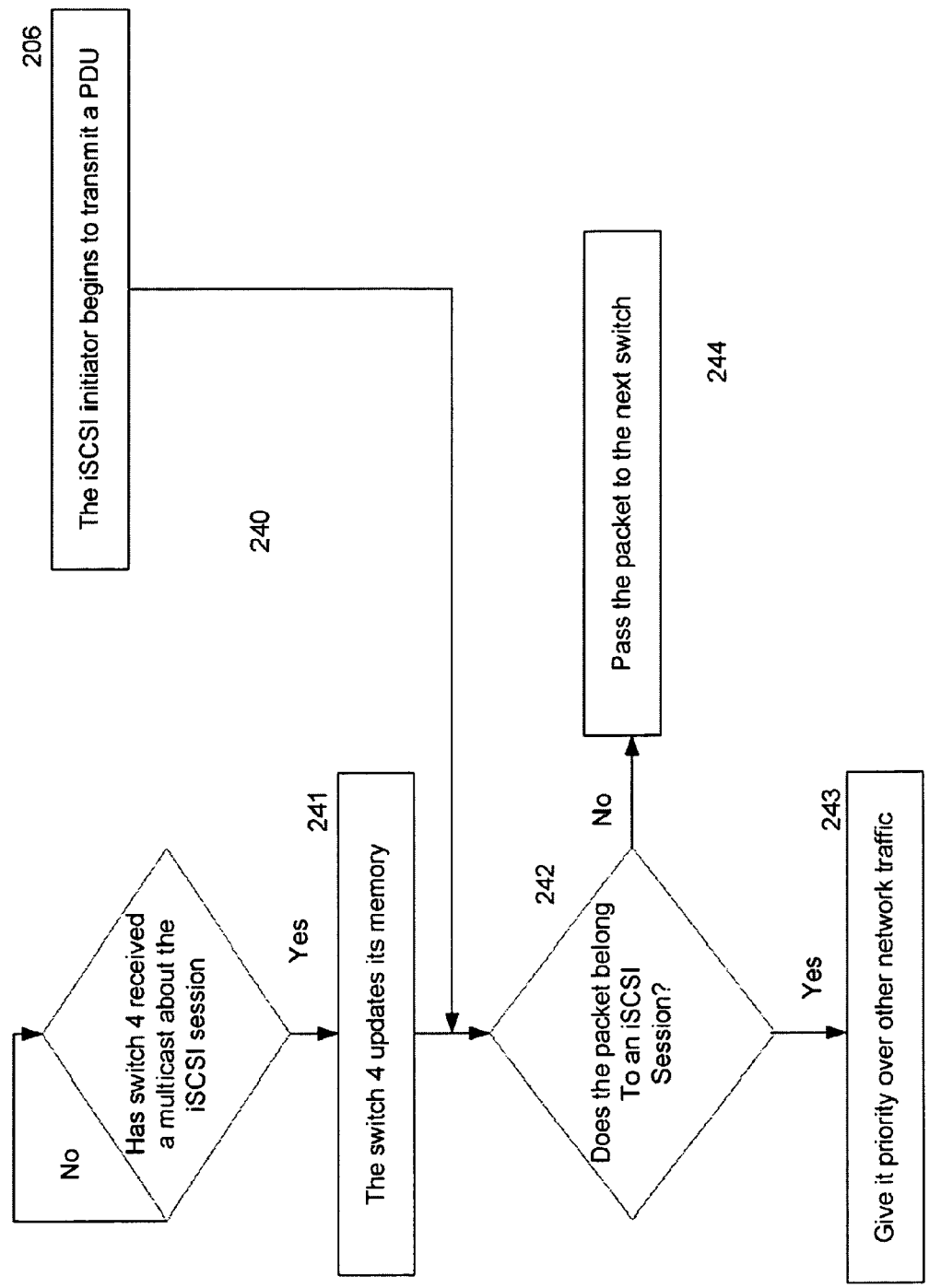

FIGS. 2A and 2B illustrate a flow chart of a method for prioritizing iSCSI traffic according to one embodiment of the present invention. At 201, the iSCSI initiator 10 in FIG. 1 may want to write data to the iSCSI target 20, and send a request to the iSNS server 30 through switches 6, 5, 3 and the VLAN3 to obtain information about the iSCSI target 20, e.g., its presence and location. The initiator 10 may identify the target 20 by its iSCSI qualified name or enterprise unique identifier. In one embodiment, the port number of the iSCSI initiator 10 may be, for example, 79.

At 202, the iSNS server 30 may determine that the request is for an iSCSI session, the port number of the iSCSI target 20 may be, for example, 92, and the iSCSI target 20 is available for the requested write operation.

At 203, the iSNS server 30 may send a response back to the iSCSI initiator 10 via switches 3, 5 and 6 and the VLAN3, and the response may include information about the iSCSI target 20, e.g., its port number 92 or its IP address. In one embodiment, the iSCSI session may be defined in the response as a write operation from an iSCSI port 79 to an iSCSI port 92.

The switch 3 may switch the network traffic as it usually does until it detects iSCSI related multicasting. At 220, the switch 3, which is an iSCSI-aware switch, may listen to the response from the iSNS server 30 to the iSCSI initiator 10 and determine whether it includes information related to an iSCSI session, e.g., the port or IP address of the iSCSI target 20.

If the response includes information related to an iSCSI session, at 221, the switch 3 may update its memory to store the information about the iSCSI session. At 222, the switch 3 may update its hardware and software and multicast the information about the iSCSI session via VLAN1, VLAN2 and VLAN3. In one embodiment, the multicast may include: a write operation from an iSCSI port 79 to an iSCSI port 92. The switch 3 may then resume switching network traffic. 220-222 may happen in parallel with the signaling among the iSCSI initiator 10, the iSCSI server 20 and the iSNS server 30.

It is noted that each switch on the communication path from the iSNS server 30 to the iSCSI initiator 10 may be able to detect the information about iSCSI session and multicast it. Each switch may multicast received information about an iSCSI session. To avoid wasting time and the network resource, in an embodiment, the information may be multicast only once by the switch closest to the iSNS server. A switch may determine whether the received information about an iSCSI session is a multicast from another switch, and multicast the information only when it was not received as a multicast from another switch. For example, when receiving information about the iSCSI session from the port 79 to the port 92, the switch 5 may determine that the information is from the switch 3. The switch 5 may store the information in its memory, and update its software and hardware. But the switch 5 may not multicast the information again, since the switch 3 already multicast the information, and switches in the network will be able to receive the information.

At 204, the iSNS server 30 may send a message to the iSCSI target 20 via switches 3, 2, and 1 and the VLAN1, informing the iSCSI target 20 the port of the iSCSI initiator 10 and the write command. Although in the embodiment of FIGS. 2A and 2B, 204 is shown after 203, it may be performed before 203 as well.

One or more of switches 3, 2 and 1 on the communication path from the iSNS server 30 and the iSCSI target 20 may perform 220-222 at 230-232 to detect information related to the iSCSI session between the iSCSI initiator 10 and target 20 (e.g., the port or IP address of the iSCSI target 20), update its memory to store the information about the iSCSI session, update its hardware and software, and multicast information about the iSCSI session. In the network shown in FIG. 1, since the iSNS server 30 communicates with both the iSCSI initiator 10 and the iSCSI target 20 via the switch 3, the most efficient way is to multicast the information about the iSCSI session only once, by the switch 3.

A switch in the network may switch network traffic according to its switch table and at the same time listen to multicast of information about iSCSI sessions. When receiving such a multicast, the switch may update its memory and then return to its normal operation. At 240, a switch, e.g., the switch 4, may detect whether information about an iSCSI session is received. If yes, at 241, the switch 4 may update its memory with the information, and update its hardware and software to be prepared to identify the iSCSI session when it arrives and give it priority.

At 205, the iSCSI target 20 may send a protocol data packet (PDU) encapsulating a ready-to-transmit message to the iSCSI initiator 10 via switches 1, 4 and 6 and the VLAN2.

At 206, after receiving the ready-to-transmit message, the iSCSI initiator 10 may begin to transmit a data PDU to the iSCSI target 20 via switches 6, 4 and 1 and the VLAN2. The path of the iSCSI data may be different from that of the iSCSI control packet.

At 242, the switch 4, which has already updated its memory, software and hardware with the information about the iSCSI session at 241, may decide whether a received packet belongs to the iSCSI session between the iSCSI initiator 10 and the iSCSI target 20.

If yes, at 243, the switch 4 may give priority to the packet, which belongs to the iSCSI session between the iSCSI initiator 10 and the iSCSI target 20, over other network traffic. Otherwise, the packet may be passed to the next switch at 244.

Although the switch 4 is not on the communication path between the iSNS server 30 and the iSCSI initiator 10, it may get information about the iSCSI session from the multicast(s) by one or more switches. Consequently, when a packet belonging to the iSCSI session arrives, the switch 4 may identify it and give it priority.

In the embodiment shown in FIGS. 1, 2A and 2B, some switches multicast information about an iSCSI session, and other switches receive the multicast to prioritize iSCSI traffic. However, it is noted that an iSCSI-aware switch may be programmed or configured both to multicast information about one iSCSI session and to receive a multicast about another iSCSI session.

Figure 3:
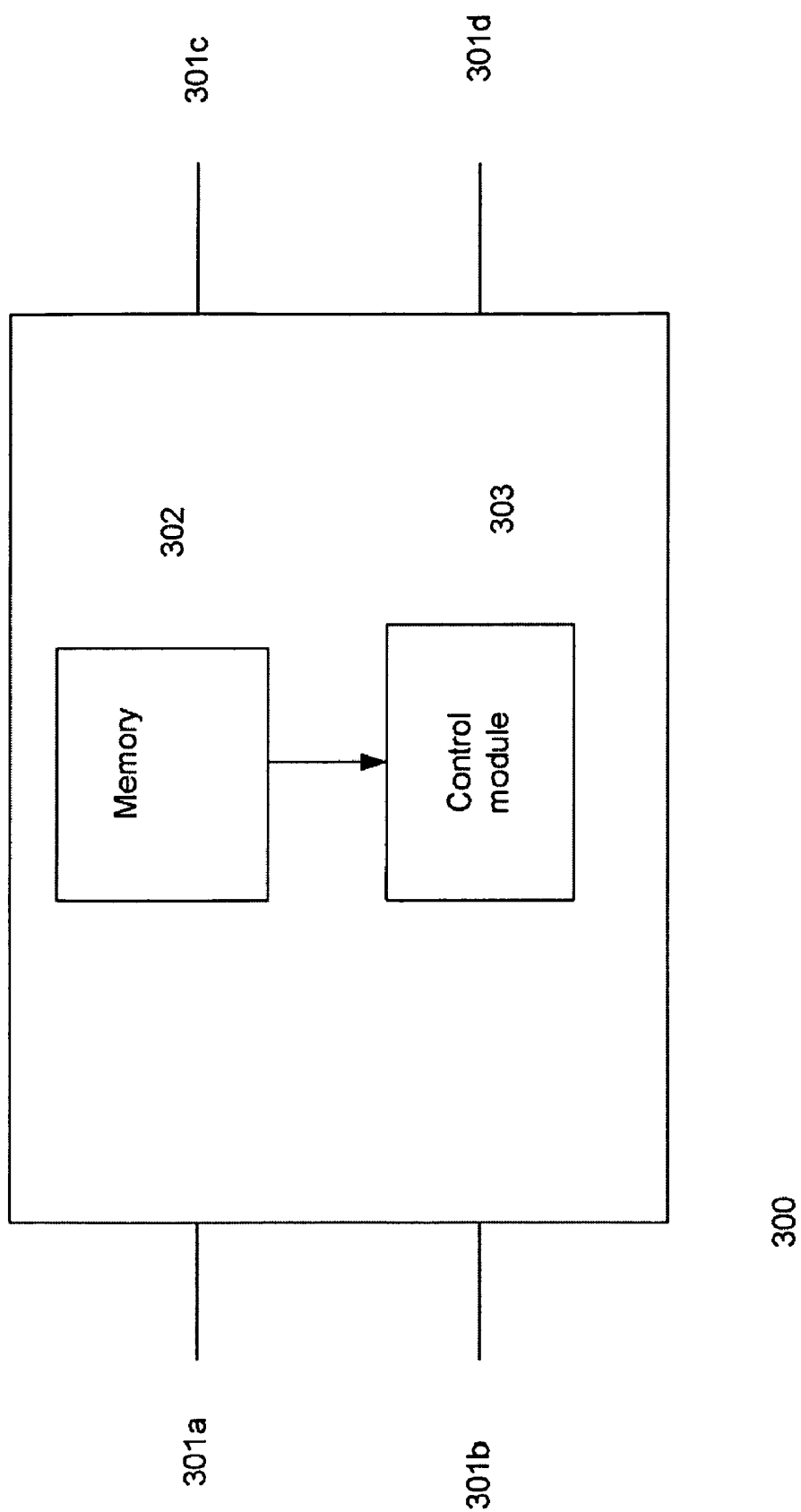
FIG. 3 illustrates a block diagram of an iSCSI-aware switch according to one embodiment of the present invention.

FIG. 3 illustrates a simplified block diagram of an iSCSI-aware switch according to one embodiment of the present invention. As shown, a switch 300 may have a number of ports 301a, 301b, 301c and 301d for passing network traffic, a memory 302 for storing a switching table and information about iSCSI sessions, and a control module 303 for controlling the operation of the switch 300, including the operation shown in FIG. 4. Specifically, the control module 303 may control the switch 300 to detect information about an iSCSI session and multicast it. At the same time, the control module 303 may control the switch 300 to receive a multicast of information about iSCSI sessions from other switches and update its hardware and software to track the iSCSI session and give it priority over other network traffic when it arrives.

Figure 4:
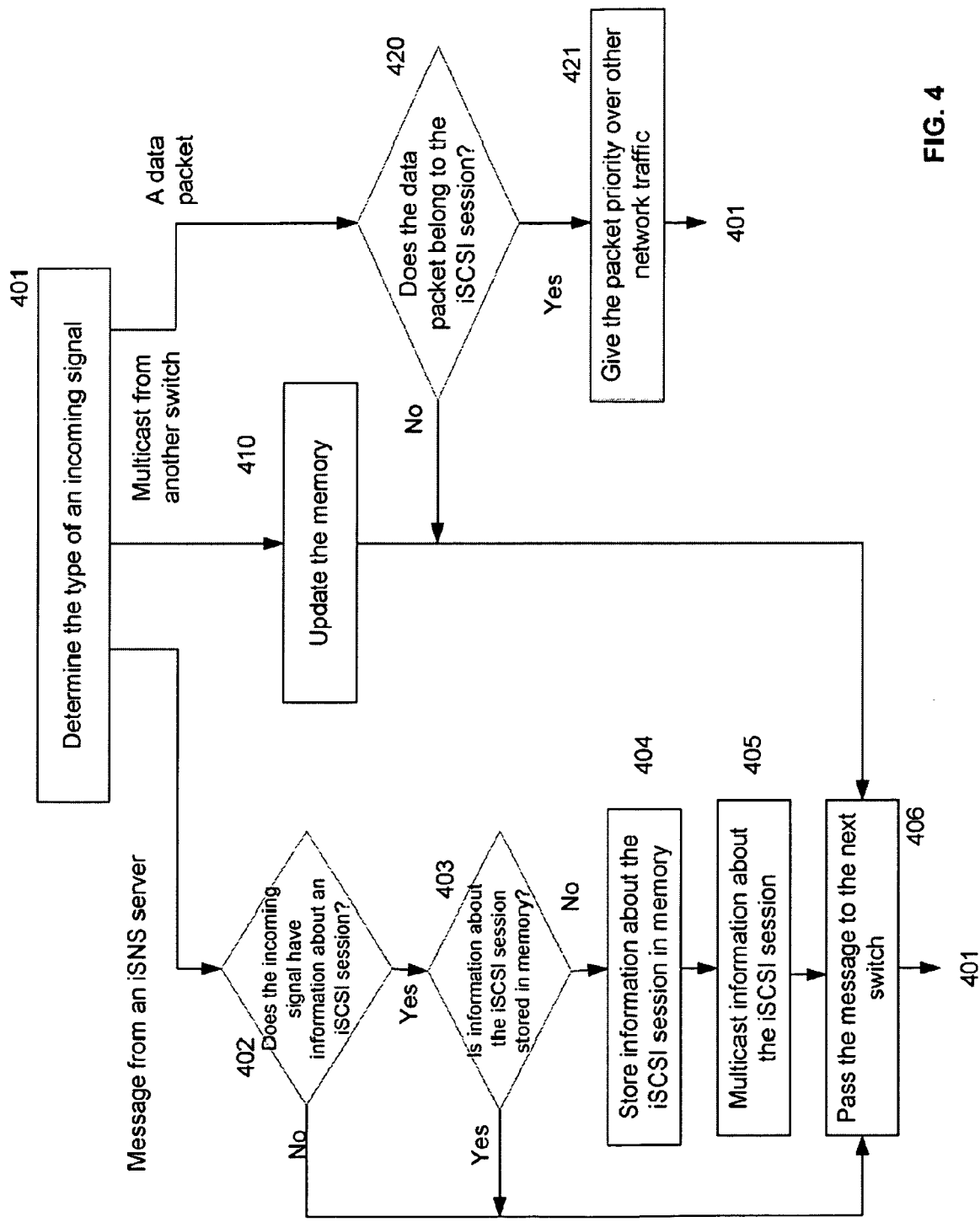
FIG. 4 illustrates a flow chart of the operation of an iSCSI-aware switch according to one embodiment of the present invention.

FIG. 4 illustrates a flow chart of the operation of an iSCSI-aware switch according to one embodiment of the present invention.

At 401, the control module 303 may determine the type of an incoming signal. If the incoming signal is a message from an iSNS server, at 402, the control module may determine whether the incoming signal has information about an iSCSI session, e.g., an iSCSI target port or IP address. If the incoming signal does not have information about an iSCSI session, the procedure may proceed to 406.

If the incoming signal has information about an iSCSI session, at 403, the control module may determine whether information about the iSCSI session has already been stored in the memory of the switch. If yes, the procedure may proceed to 406. Otherwise, the information may be stored in the memory at 404, and the control module may control the hardware and software of the switch to multicast the information about the iSCSI session to other switches in the network at 405. At 406, the switch may pass the received message to the next switch in the network and then return to 401.

If the incoming signal is a multicast of information about an iSCSI session from another switch, at 410, the control module may update the switch's memory with the information. The procedure may then proceed to 406.

If the incoming signal is a data packet, at 420, the control module may determine whether the packet belongs to the multicast iSCSI session. If yes, the control module may give the data packet priority over other network traffic at 421 and the procedure may return to 401. Otherwise, the procedure may proceed directly to 406.

Several features and aspects of the present disclosure have been illustrated and described in detail with reference to particular embodiments by way of example only, and not by way of limitation. Alternative implementations and various modifications to the disclosed embodiments are within the scope and contemplation of the present disclosure. Therefore, it is intended that the invention be considered as limited only by the scope of the appended claims.

What is claimed is:

1. An iSCSI-aware switch, comprising:
at least two ports for passing network traffic;
a memory for storing a switching table, and information about an iSCSI session received in an iSCSI control information multicast; and
a control module for determining whether an incoming signal has control information originated from an iSCSI server to a first iSCSI initiator about a first iSCSI session between the first iSCSI initiator and a first iSCSI target, and multicasting the control information about the first iSCSI session to at least one other switch in an iSCSI-capable network over a path different from a path of iSCSI control packets of the first iSCSI session involving a first iSCSI server, to enable the at least one other switch which is not on the path of the iSCSI control packets can to receive the control information about the first iSCSI session before the first iSCSI session arrives and give priority to the first iSCSI session when it arrives.

2. The switch of claim 1, wherein the control information about the first iSCSI session is an iSCSI target port number.

3. The switch of claim 1, wherein the control information about the first iSCSI session is an IP address of an iSCSI target.

4. The switch of claim 1, wherein the control module further determines whether the control information about the first iSCSI session is stored in the memory, and updates the memory if it is not.

5. The switch of claim 1, wherein the control module further determines whether the incoming signal is a multicast from a second switch, and multicasts the control information about the first iSCSI session when the incoming signal is not a multicast from the second switch.

6. The switch of claim 1, wherein the control module stores control information about a second iSCSI session in the memory when the incoming signal is a multicast from a third switch about the second iSCSI session.

7. The switch of claim 6, wherein the control module further determines whether an incoming packet belongs to the second iSCSI session.

8. The switch of claim 6, wherein the control module determines whether an incoming packet belongs to the second iSCSI session by comparing the packet's sender port with stored information about the second iSCSI session.

9. The switch of claim 6, wherein the control module gives an incoming packet priority over other network traffic if it belongs to the second iSCSI session.

10. A method for processing iSCSI traffic in an iSCSI-capable network, the method comprising:
receiving an incoming signal at a first iSCSI-aware switch;
detecting at the first iSCSI-aware switch whether the incoming signal includes control information originated from an iSCSI server to a first iSCSI initiator about a first iSCSI session between the first iSCSI initiator and a first iSCSI target; and
multicasting the control information about the first iSCSI session to at least one other switch in the iSCSI-capable network over a path different from a path of iSCSI control packets of the first iSCSI session involving a first iSCSI server, to enable the at least one other switch which is not on the path of the iSCSI control packets to receive the control information about the first iSCSI session before the first iSCSI session arrives and give priority to the first iSCSI session when it arrives.

11. The method of claim 10, wherein the control information about the first iSCSI session is an iSCSI target port number.

12. The method of claim 10, wherein the control information about the first iSCSI session is an IP address of an iSCSI target.

13. The method of claim 10, further comprising: updating a memory of the first iSCSI-aware switch when the control information about the first iSCSI session is not stored in the memory.

14. The method of claim 10, further comprising: determining whether the incoming signal is a multicast from a second iSCSI switch, and multicasting the control information about the first iSCSI session when the incoming signal is not a multicast from the second iSCSI-aware switch.

15. The method of claim 10, further comprising: receiving the multicasted control information about the first iSCSI session at a third iSCSI-aware switch and storing the control information about the first iSCSI session in a memory of a the third iSCSI-aware switch.

16. The method of claim 15, further comprising: determining whether an incoming packet at the third iSCSI-aware switch belongs to the first iSCSI session.

17. The method of claim 15, further comprising: comparing the packet's sender port with the control information about the first iSCSI session stored in the memory of the third iSCSI-aware switch.

18. The method of claim 16, further comprising: at the third iSCSI-aware switch, giving an incoming packet priority over other network traffic if it belongs to the first iSCSI session.

19. A computer program product comprising a non-transitory computer-readable medium having instructions which, when executed by a computer, perform the method of claim 10.

20. A computer program product comprising a non-transitory computer-readable medium having instructions which, when executed by a computer, perform the method of claim 16.

21. A method for processing iSCSI traffic in an iSCSI-capable network, the method comprising:
receiving at least two traffic flows;
receiving control information originated from an iSCSI server to a first iSCSI initiator about a first iSCSI traffic flow between the first iSCSI initiator and a first iSCSI target from a multicast over a path different from a path of iSCSI control packets of the first iSCSI traffic flow before the first iSCSI session arrives; and
granting priority to the first iSCSI traffic flow based on the control information when the first iSCSI traffic flow arrives.

* * * * *

UNITED STATES PATENT AND TRADEMARK OFFICE
CERTIFICATE OF CORRECTION

| | | |
|---|---|---|
| PATENT NO. | : 7,843,931 B1 | Page 1 of 1 |
| APPLICATION NO. | : 12/140203 | |
| DATED | : November 30, 2010 | |
| INVENTOR(S) | : Tal Anker, Alon Harel and Shlomo Pangratz | |

It is certified that error appears in the above-identified patent and that said Letters Patent is hereby corrected as shown below:

On the Title Page:

Item (75) Inventors should read as follows:

Tal Anker, Modiin (IL); Alon Harel, Ramat-Gan (IL); Shlomo Pongratz, Tel-Aviv (IL)

Signed and Sealed this
Eleventh Day of January, 2011

David J. Kappos
*Director of the United States Patent and Trademark Office*